(12) United States Patent
Gay-Bellile et al.

(10) Patent No.: US 7,552,159 B2
(45) Date of Patent: Jun. 23, 2009

(54) TRANSFORM CALCULATION DEVICE

(75) Inventors: Olivier Gay-Bellile, Paris (FR); Xavier Marchal, Coubevoie (FR)

(73) Assignee: NXP B.V., Eindhoven (NL)

( * ) Notice: Subject to any disclaimer, the term of this patent is extended or adjusted under 35 U.S.C. 154(b) by 991 days.

(21) Appl. No.: 10/474,120

(22) PCT Filed: Apr. 8, 2002

(86) PCT No.: PCT/IB02/01253

§ 371 (c)(1),
(2), (4) Date: Oct. 7, 2003

(87) PCT Pub. No.: WO02/084514

PCT Pub. Date: Oct. 24, 2002

(65) Prior Publication Data

US 2004/0111458 A1    Jun. 10, 2004

(30) Foreign Application Priority Data

Apr. 10, 2001    (FR) .................................. 01 04861

(51) Int. Cl.
*G06F 17/14* (2006.01)

(52) U.S. Cl. ...................................... 708/400; 708/404
(58) Field of Classification Search ......... 708/400–404, 708/406
See application file for complete search history.

(56) References Cited

U.S. PATENT DOCUMENTS

| | | | | | |
|---|---|---|---|---|---|
| 3,973,112 | A | * | 8/1976 | Sloane | 702/111 |
| 4,138,730 | A | * | 2/1979 | Ali | 708/404 |
| 6,990,062 | B2 | * | 1/2006 | Greaves et al. | 370/210 |
| 7,062,523 | B1 | * | 6/2006 | Hoffman et al. | 708/404 |

OTHER PUBLICATIONS

"Efficient FFT and Equalizer Implementation for OFDM Receivers" published by IEEE Transactions on Consumer Electronics, Nov. 4, 1999, in vol. 45 No. 4, pp. 1104-1107.

* cited by examiner

*Primary Examiner*—Chuong D Ngo

(57) ABSTRACT

The present invention relates to a discrete transform calculation device (FFTP). The device has control means (CNTRL) which configure first and second memories (RAM1 and RAM2) according to the number of transforms used during a first processing. The device applies in particular to a demodulator which allows management of several Fourier transforms in parallel.

7 Claims, 4 Drawing Sheets

TRANSFORM CALCULATION DEVICE

Figure 1:
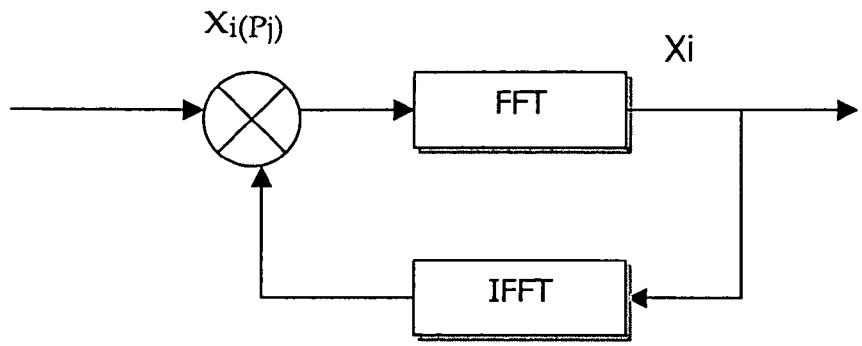

The present invention relates to a device for calculating discrete transforms having a first memory for storing samples and a second memory for recording the intermediate calculation results. The invention also relates to a calculation method adapted to said device.

The invention finds a particular application notably in channel decoding during terrestrial signal transmissions.

The document "Efficient FFT and Equalizer Implementation for OFDM Receivers" published by IEEE Transactions on Consumer Electronics, 4 Nov. 1999, in Vol 45 N° 4, pages 1104-1107, describes a device for calculating discrete transforms, here Fourier transforms in an OFDM (Orthogonal Frequency Division Multiplexing) receiver. When said receiver receives a signal, it receives it in the form of packets of samples in the first memory, the packets being of variable size according to the standard used. In the DVB-T (Digital Video Broadcasting Terrestrial) standard, published by the ETSI (European Telecommunications Standard Institute), which uses OFDM receivers, the packet sizes are 2 kilobytes or 8 kilobytes. The receiver includes a calculation device for calculating a Fourier transform on the samples received in a packet. Intermediate results are recorded in the second memory. The device awaits the reception of the set of samples of a packet in order to terminate the Fourier transform calculation with the intermediate results, and to once again commence calculation on samples in a new packet.

This state of the art makes it possible to calculate only one Fourier transform at a time.

Thus one technical problem to be resolved by the present invention is to propose a discrete transform calculation device having a first memory for storing samples and a second memory for recording intermediate calculation results, as well as an associated calculation method which make it possible to calculate several discrete transforms in parallel.

One solution to the technical problem posed is characterized, according to a first object of the invention, in that the calculation device has control means able to configure the first and second memories according to a number of discrete transforms used during a first processing, the transforms having variable sizes, where applicable.

According to a second object of the present invention, this solution is characterized in that the calculation method includes a step of configuring the first and second memories according to a number of discrete transforms used during a first processing, the transforms having, where applicable, variable sizes.

Thus, as will be seen in detail below, the configuration makes it possible, by virtue of a division of the memories into several memory areas according to the number of discrete transforms used during a first processing, to be able to manage several transform calculations in parallel.

Figure 2:
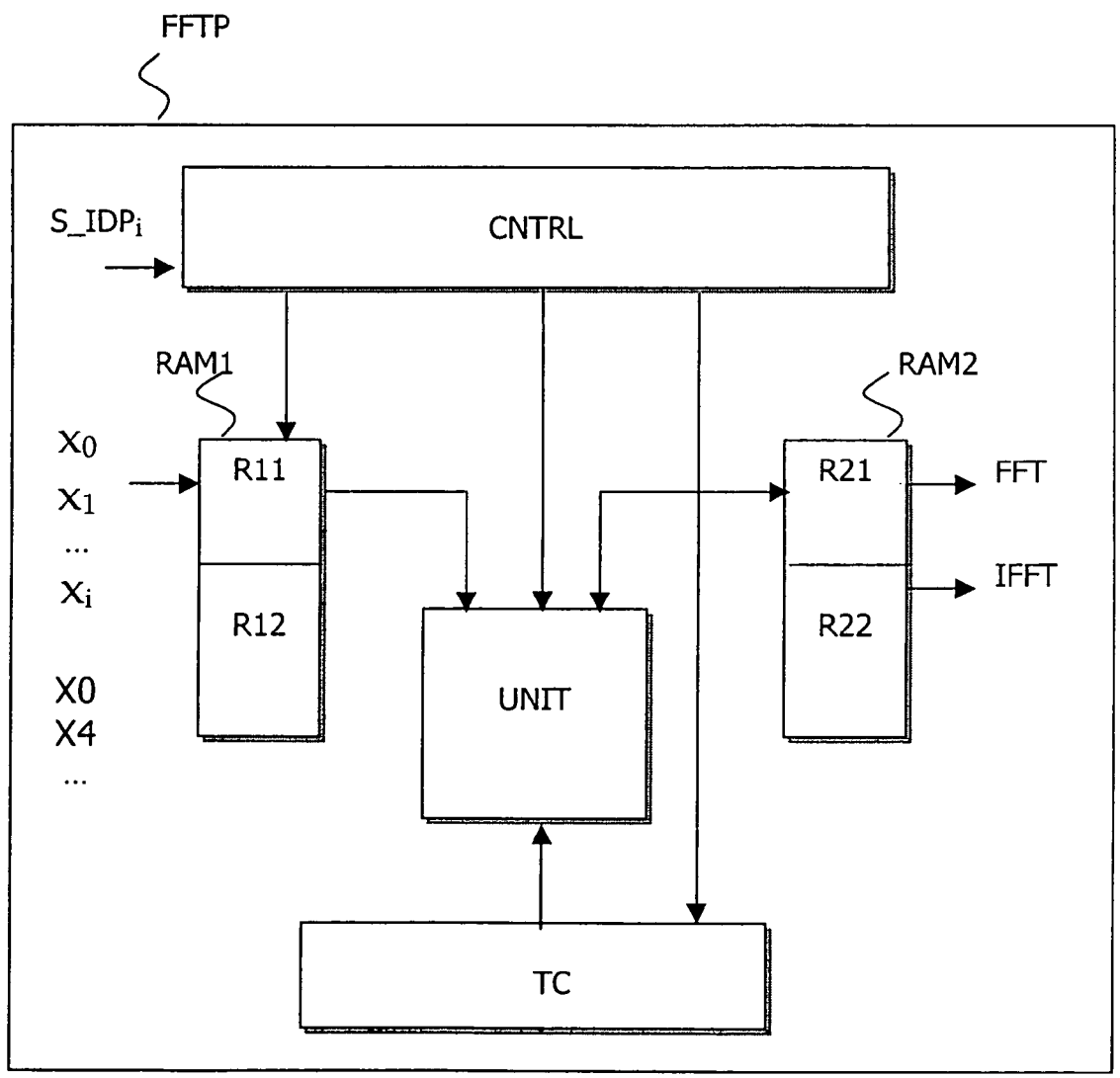
Figure 3:
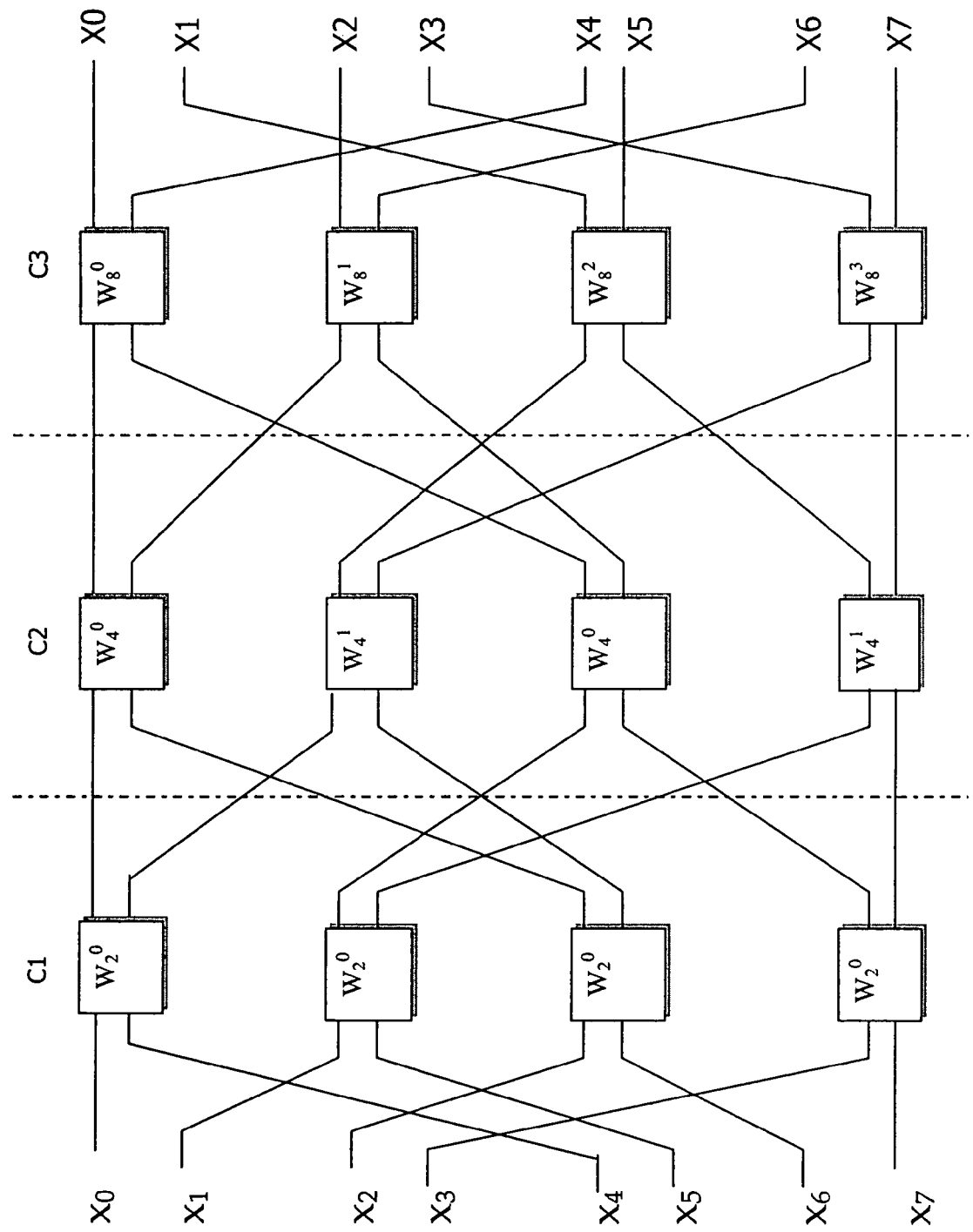
Figure 4:
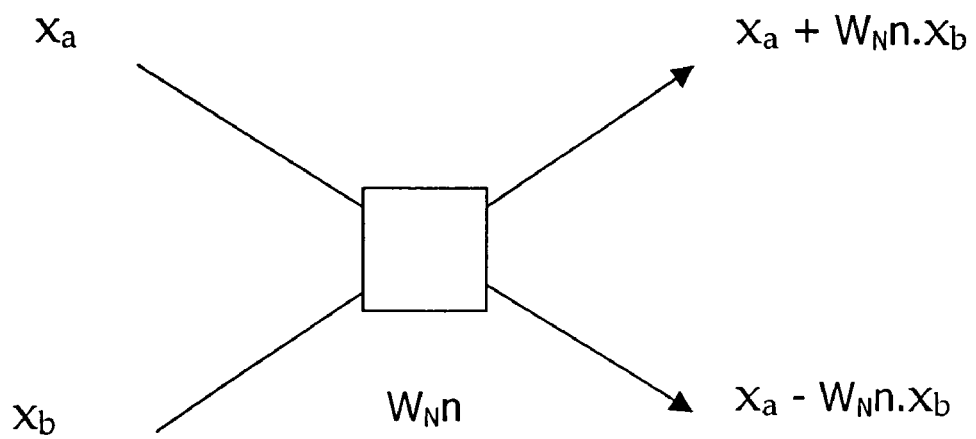
Figure 5:
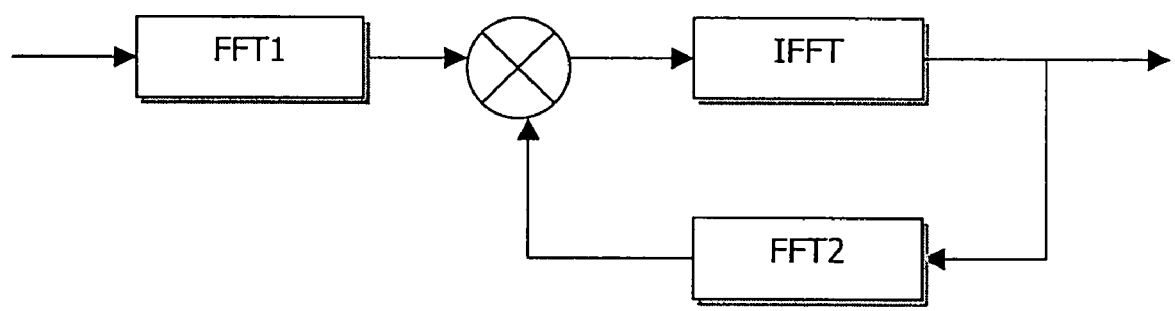
Figure 6A:
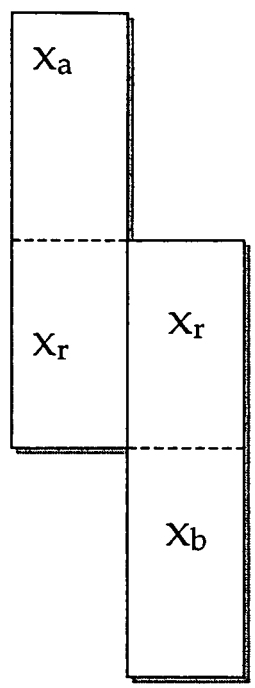
Figure 6B:
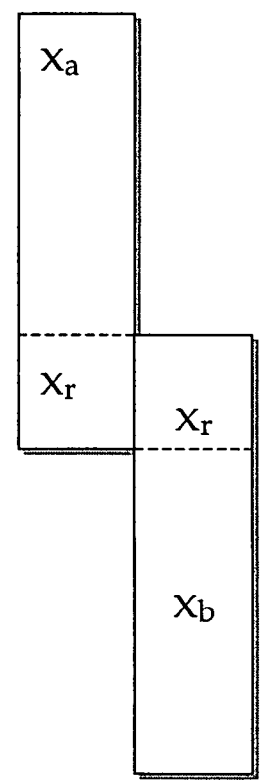
Figure 7:
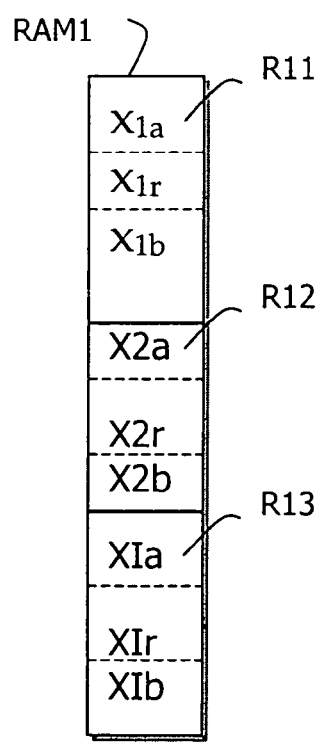

The invention will be further described with reference to examples of embodiments shown in the drawings to which, however, the invention is not restricted:

FIG. 1 is a diagram representing a first processing effected by the calculation device according to the invention, FIG. 2 illustrates schematically an architecture of the calculation device according to the invention, FIG. 3 illustrates a flow chart showing calculations made by the calculation device of FIG. 2, FIG. 4 depicts a calculation operation performed by the calculation device of FIG. 2, FIG. 5 is a diagram depicting a second processing performed by the device according to the invention, FIG. 6a is a diagram depicting a first calculation method effected during the second processing by the calculation device of FIG. 2, FIG. 6b is a diagram depicting a second calculation method effected during the second processing by the calculation device of FIG. 2, FIG. 7 is a diagram depicting a memory organization during the second processing by the calculation device of FIG. 2.

The present disclosure of the invention relates to an example of a device for calculating discrete transforms, here Fourier transforms, in a receiver used in the field of terrestrial television.

In the field of signal transmissions on a channel (not shown), in particular in the field of terrestrial television, a transmitter and a receiver are used. The transmitter effects a signal modulation transforming a digital signal into an analog signal and sends said signal through the channel. At the output from the channel, the signal is received by the receiver, which effects a signal demodulation converting the analog signal into a digital signal. At the time of transmission, an error correcting coding is performed so that subsequently, at the time of reception, it makes it possible to correct errors introduced by interference on said channel.

In the case of the DVB-T standard, various techniques are used such as the OFDM technique in Europe during a first demodulation processing. This technique uses fast Fourier transform calculations. There are several types of fast Fourier transform. A direct Fourier transform FFT and an inverse Fourier transform IFFT.

The abbreviation FFT will be used in the remainder of the description to design the term "direct fast Fourier transform" and IFFT for designating the term "inverse fast Fourier transform". Naturally the invention is not limited to these types of Fourier transforms.

In this technique, during a demodulation processing, the two types of transforms are used. A direct transform FFT is used for demodulation strictly speaking and an inverse transform IFFT is used notably for synchronization with the transmitter in time and frequency. It should be noted that the direct transform FFT corresponds to an inverse transform of a transform IFFT used during the modulation performed in the transmitter, the latter transform IFFT then being the only IFFT used during the modulation, for example OFDM.

FIG. 1 is a diagram representing a processing of Fourier transforms in the OFDM technique according to the DVB-T standard.

During reception of a digital signal, the receiver receives it in the form of packets Pj (j>0) of samples $x_i$ (i≧0). The samples are received, for an OFDM receiver to the DVB-T standard, in packets Pj of size 2 kilobytes or 8 kilobytes. The packets Pj are demodulated by the receiver. The demodulation uses two transforms, an FFT and an IFFT, as indicated in FIG. 1. However, several calculations of these two transforms used FFT and IFFT are effected. Care should be taken to make a distinction between the terms "used" and "calculated" in the description. The calculation of an FFT is effected on all the samples $x_i$ of a packet Pj, whereas the calculation of an IFFT is effected on result samples $X_i$ issuing from several FFT calculations, for example by taking 1 result sample out of 4. The calculation of an IFFT is then effected at a frequency lower than an FFT calculation.

The demodulation is effected by means of a Fourier transform calculation device FFTP. The calculation device FFTP is depicted in FIG. 2. It has a first memory RAM1, a calculation unit UNIT, a second memory RAM2, and control means CNTRL. It also has a table TC comprising Fourier transform coefficients. The first and second memories RAM1 and RAM2 are preferably volatile and rewritable.

In an initialization step INIT, the control means CNTRL configure. the first RAM1 and the second RAM2 memories in order to receive samples $x_i$ of packets and intermediate Fourier transform calculation results, respectively.

The configuration is carried out according to the number of Fourier transforms used during a demodulation processing, the transforms having, where applicable, a variable size, here 2 kilobytes or 8 kilobytes. In the example disclosed, two transforms are used. Consequently the first and second memories RAM1, RAM2 are divided respectively into two memory areas R11, R12 and R21, R22. The first memory area R11 of the first memory RAM1 stores samples $x_i$ on which an FFT will be calculated, while its second memory area R12 stores result samples on which an IFFT will be calculated. Preferentially, the first memory area R11 of the first memory R1 has a size equal to the maximum size of an FFT to be calculated, that is to say here 8 kilobytes (when there is no overlap as will be seen in detail below). The first memory area R21 of the second memory RAM2 stores intermediate results of an FFT, while its second memory area R22 stores intermediate results of an IFFT. Naturally, where a single transform is used, such a division into memory areas would not be necessary. It should be noted that the size of the transforms in the receiver is determined by the transmitter and according to reception conditions. Thus this size may change. For example, in the case of interference on the channel giving rise to poor reception, a size of 2 kilobytes could be changed to 8 kilobytes. However, in general, the size of a transform remains stable for a certain length of time.

During this same initialization step INIT, the control means CNTRL preferentially determine the priorities for calculating one type of transform compared with another type of transform and therefore as a function of the type of transform used. Preferentially, an FFT has priority over an IFFT.

It will be noted that the table TC includes the coefficients W necessary for the calculations of transforms used. The coefficients are sine/cosine values. The transforms have some of the coefficients in common. An IFFT has as much need of coefficients as the corresponding FFT of the same size. For example, an FFT transform of size 8 kilobytes uses all the coefficients, an FFT transform of size 2 kilobytes uses one quarter of the coefficients and an IFFT transform of 8 kilobytes uses all the coefficients in an order other than that of the 8 kilobyte FFT etc. Thus, in the example disclosed, the table TC of coefficients preferentially includes the coefficients of the transform with the largest size, that is to say, here, 8 kilobytes. The coefficients of the transforms being known, the table TC of coefficients is preferentially included in a third non-volatile non-rewritable ROM memory (not shown). It should be noted that, in another embodiment it is possible to use only the first quarter of the third ROM memory and to use reversals of signs known to one of ordinary skill in the art in order to emulate the other three quarters.

Naturally, in another embodiment, it would be possible to configure the table of coefficients TC during the initialization step by means of the control means CNTRL. In this case, the table would be included in a third non-volatile rewritable EEPROM memory.

An FFT is calculated according to a flow diagram. A flow diagram includes coefficients $W_N^n$, $N \geq 2$, $n \geq 0$. Final results $Xi$ are calculated from samples $x_i$ and coefficients $W_N^n$. Said coefficients $W_N^n$ are given by the table of coefficients TC. The calculation of an IFFT is based on the same principle.

To perform said calculations, various algorithms known to one of ordinary skill in the art can be used, such as the Cooley-Tukey algorithm, also referred to as the reduction to base 2 or radix 2 algorithm. This algorithm requires a number of samples $x_i$ which are a power of 2. According to the algorithm, the radix of the algorithm and the size of a packet, a concept of layer C is defined. For example, for a packet with a size of 8 kilobytes and a radix 2, this gives $8192=2^{13}$, which makes 13 radix 2 layers. For a radix 4, there are 6 radix 4 layers and 1 radix 2 layer. FIG. 3 depicts a flow diagram of a first embodiment of an FFT calculation according to the Cooley-Tukey algorithm for 8 samples $x_0$ to $x_7$.

A layer C corresponds to a column in said diagram. This gives the following equation (1).

$$\begin{aligned}
X0 &= x_0 + x_4 W_2^0 + W_4^0(x_2 + x_6 W_2^0) + W_8^0[x_1 + x_5 W_2^0 + W_4^0(x_3 + x_7 W_2^0)], \\
X1 &= x_0 - x_4 W_2^0 + W_4^1(x_2 - x_6 W_2^0) + W_8^1[x_1 - x_5 W_2^0 + W_4^1(x_3 - x_7 W_2^0)], \\
X2 &= x_0 + x_4 W_2^0 - W_4^0(x_2 + x_6 W_2^0) + W_8^2[x_1 + x_5 W_2^0 - W_4^0(x_3 + x_7 W_2^0)], \\
X3 &= x_0 - x_4 W_2^0 - W_4^1(x_2 - x_6 W_2^0) + W_8^3[x_1 - x_5 W_2^0 - W_4^1(x_3 - x_7 W_2^0)], \\
X4 &= x_0 + x_4 W_2^0 + W_4^0(x_2 + x_6 W_2^0) - W_8^0[x_1 + x_5 W_2^0 + W_4^0(x_3 + x_7 W_2^0)], \\
X5 &= x_0 - x_4 W_2^0 + W_4^1(x_2 - x_6 W_2^0) - W_8^1[x_1 - x_5 W_2^0 + W_4^1(x_3 - x_7 W_2^0)], \\
X6 &= x_0 + x_4 W_2^0 - W_4^0(x_2 + x_6 W_2^0) - W_8^2[x_1 + x_5 W_2^0 - W_4^0(x_3 + x_7 W_2^0)], \\
X7 &= x_0 - x_4 W_2^0 - W_4^1(x_2 - x_6 W_2^0) - W_8^3[x_1 - x_5 W_2^0 - W_4^1(x_3 - x_7 W_2^0)].
\end{aligned} \quad \text{equation(1)}$$

Equation (1) is divided into so-called "butterfly" operations as indicated in FIG. 4. The first layer C1 is composed of "butterfly" operations using solely the coefficient $W_2^0$ and the received samples $x_0$ to $x_7$. Naturally, according to the radix, the algorithm used and the number of processors in the calculation unit UNIT, equation (1) may vary and consequently the composition of a layer may vary.

When the calculation device FFTP receives packets Pj of samples $x_i$, it will calculate an FFT or an IFFT. The samples are received at a frequency Fx. The processing of the samples $x_i$ takes place in the following manner.

In a first step A), according to the example in FIG. 2, the calculation device FFT receives samples $x_0, x_1, x_2, x_3, \ldots, x_i$ coming from a first packet P1 (not shown). The control means CNTRL receive, simultaneously with the reception of each sample $x_i$, a packet identification signal $S\_IDP_j$. Said signal indicates the packet Pj to which the sample belongs as well as the size of said packet. This size is also referred to as the length of the FFT which will be calculated on each packet Pj. In this example, the packet P1 has a size of 8 kilobytes.

It should be noted that, at each reception of a sample, the control means CNTRL determine, according to the transform used and to be calculated, addresses of the first memory RAM1 in which said samples received will be stored. If an FFT is calculated, the addresses are taken from the first memory area R11, otherwise from the second memory area R12. The samples $x_i$ are stored in said memory addresses. The same applies to the addresses of the second memory RAM2, in which the intermediate results will be stored.

It should be noted that the control means CNTRL wait until the calculation device FFTP has received all the samples of a packet Pj before commencing calculation of an FFT. Likewise, the control means CNTRL wait until the calculation device FFTP has received all the result samples necessary for an IFFT calculation before commencing said calculation, whatever the radix of the algorithm used. In a second step B), when the calculation device FFTP has received and stored all the samples necessary for calculating a transform, the calculation unit UNIT of said device executes said calculation. It should be noted that, initially, the first calculation effected is the calculation of an FFT.

The calculation unit UNIT is based on a clock frequency Fclk and has several processors PROC. According to the performance which it is wished to obtain for the calculation device FFTP, an appropriate number of processors PROC will be chosen. For example, according to a first non-limitative embodiment, the calculation unit UNIT has a single processor PROC, in order to manage simply the memories. According to a second embodiment, the calculation unit UNIT has two processors PROC, if it is wished for the calculations to be more rapid, and/or to slow down the clock frequency Fclk and/or to have a greater calculation power. This is because said calculations will be distributed over the two processors. The clock frequency Fclk is generally greater than the frequency of the samples Fx. In the case of a single processor PROC, if Fx=9.14 MHz, Fclk=30 MHz for each of the processors if there are 2 processors and Fclk=60 MHz if there is only one processor PROC. For an FFT of size 8 kilobytes and a radix 2 algorithm, 4096 "butterfly" operations are performed for each layer, which makes 4096*13 "butterfly" operations for 13 layers. Consequently 6.5 "butterfly" operations are performed per sample, which makes 6.5*9.14=59.41 mega butterflies/sec to be performed for an FFT transform calculation.

An FFT calculation, according for example to FIG. 3, is effected in the following manner. The second embodiment is taken as an example, i.e. there are two processors PROC. At a first clock pulse Fclk, the calculation unit UNIT calculates the first two "butterfly" operations of the first layer C1, using the first coefficient $W_2^0$ and the pairs of samples $(x_0,x_4)$ and $(x_1,x_5)$. The 4 intermediate results obtained during the "butterfly" operations are saved in the first memory area R21 of the second memory RAM2.

At a second clock pulse Fclk, the calculation unit UNIT calculates the following two "butterfly" operations of the first layer C1, using the first coefficient $W_2^0$ and the pairs of samples $(x_2,x_6)$ and $(x_3,x_7)$ The 4 intermediate results obtained during the "butterfly" operations are saved in the first memory area R21 of the second memory RAM2.

At a third clock pulse Fclk, the calculation unit UNIT calculates the first two "butterfly" operations of the first layer C2, using the two coefficients $W_4^0$ and $W_4^1$ and the previous intermediate results in the second memory RAM2, and so on until the end of the calculations for all the samples $x_i$ of a packet P1. Final results X0 to X7 are obtained. Some of the final results are transmitted into the second memory area R12 of the first memory R1 for calculating an IFFT.

Naturally, the control means CNTRL supply, according to the size and type of the Fourier transform, the addresses of the appropriate coefficients $W_N^n$ in the table of coefficients TC for each "butterfly" operation.

In a third step C), after having calculated an FFT, the calculation unit UNIT calculates an IFFT with the samples stored in the second memory area R12 of the first memory RAM1, i.e. with the final results issuing from several FFT calculations. The same type of calculations as those performed for an FFT are executed.

However, in parallel to these calculations, the calculation device FFTP still receives samples $x_i$ of various packets Pj. Now, an FFT calculation has priority compared with an IFFT calculation. Thus, when said calculation device FFTP has received all the samples $x_i$ of the packet Pj in order to effect a second FFT calculation, the control means CNTRL wait until the unit UNIT ends the "butterfly" operation which it is in the process of performing on the current IFFT and then store a context CTXT relating to said current calculation of the current IFFT, in order to be able to effect the second FFT calculation in priority over said calculation of the IFFT. The context CTXT preferentially includes the number of the layer to which the calculated "butterfly" operation belongs and the number of the calculated "butterfly" operation or the number of the following "butterfly" operation to be calculated. The control means CNTRL also store the addresses of the samples $x_i$ and of the coefficients $W_N^n$ necessary for the "butterfly" operation of the context CTXT, addresses situated respectively in the second memory RAM2 and in the table of coefficients TC. A complete FFT calculation is subsequently effected according to the second step B), in priority over the calculation of the IFFT. At the end of said calculation, the calculation of the IFFT resumes.

It should be noted that, if the calculation device FFTP has not yet received all the samples $x_i$ necessary for another FFT calculation, the calculation unit can effect a calculation of IFFT while waiting, when it has all the samples necessary for said calculation. Thus, according to the above, an IFFT calculation takes place solely when no FFT calculation is possible.

In a last step D), the calculation device FFTP sends the result samples Xi calculated to equalization units to compensate for any imperfections in the channel, and then subsequently to error correction units, well known to one ordinary skill in the art, using algorithms such as Viterbi, Reed-Salomon etc algorithms. At the end of the chain of these units, there is a signal which is used by a source decoder (of the MPEG style for video) and sent to a television for example. It should be noted that, at the same time as these sendings, result samples Xi are also transmitted in the second memory area R12 of the first memory R1 for the IFFT calculations, as seen previously.

According to a variant embodiment, the device also has multiplexing means (not shown) for making an exchange of role for the memories between the first and second memories R1 and R2, the first memory R1 becoming the memory comprising intermediate results and the second memory becoming the memory comprising input samples for calculating a new operation. This system (normally referred to in English as "swapping memory"), known to one of ordinary skill in the art, affords a saving in memory space.

Thus the device according to the invention has a first advantage, which is to be able to effect several Fourier transform calculations, where necessary of different sizes, in parallel. The term parallel means that samples and result samples are received in parallel in various memory areas, and that a switch is made from one transform calculation to another calculation without necessarily waiting for the end of a complete calculation.

A second advantage is the management of the calculations without wasting any time in using the processor or processors utilized.

A third advantage is a reduction in terms of means used for such calculations of transforms during a channel decoding. This is because, in the context of the invention, in order to effect several calculations in parallel, a single calculation unit UNIT is used, a single control CNTRL is used as well as a single sample reception memory RAM1. In the aforementioned state of the prior art, if it is wished to perform several calculations in parallel, it is necessary to have several calculation units, several controllers and several memories. Thus, the invention disclosed thus affords a saving in silicon surface used.

Naturally, the scope of the invention is in no way limited to the embodiment described and extends, for example, to other embodiments in which other algorithms are used.

Likewise, the invention can apply to demodulators other than those based on the OFDM technique. For example, it can apply to the VSB ("Vestigial Sideband Modulation") technique used in the United States in a frequency domain.

This VSB technique also uses Fourier transforms when it is used in a frequency domain. It uses three of them as indicated in FIG. 5: two FFTs (FFT1 and FFT2) and one IFFT.

When a signal is received, the receiver receives a digital signal in the form of samples x. It receives them in packets of 1 kilobyte or 2 kilobytes. The transforms are calculated from a packet of samples. For each sample, several operations are performed, which also use a certain number of adjacent samples. Thus, for the samples situated at the edge of the packet of samples received, there are so-called "edge effect" problems during the execution of an operation. In order to mitigate this drawback, use is made of an overlapping technique. There are generally overlaps of half a packet of samples or overlaps of a quarter of a packet of samples between two packets of samples received consecutively, as shown in FIGS. 6a and 6b. In other words, one half or one quarter of the samples in a packet will serve for the calculation of the transform of this packet and for the calculation of the transform of the following packet. The transforms (FFT1, FFT2 and IFFT) used are independent of each other, that is to say the overlappings take place solely on calculations of transforms of the FFT1, or on calculations of transforms of the FFT2, or on calculations of transforms of the IFFT.

For this purpose, the calculation device FFTP has three memory areas R11, R12 and R13 in the first memory RAM1 and three memory areas R21, R22 and R23 in the second memory RAM2, as shown by the example in FIG. 7. On the one hand, the first memory area R11 of the first memory RAM1 stores received samples (x1a, x1r, x1b) necessary for calculating two transforms (FFT1a and FFT1b) for the first FFT1 used, and on the other hand the second memory area R12 of the first memory RAM1 stores the received result samples (X2a, X2r, X2b) necessary for the calculation of two transforms (FFT2a and FFT2b) for the second FFT2 used, and, finally, the third memory area R13 of the first memory RAM1 stores received result samples (XI1, XIr, XI2) necessary for the calculation of two transforms (IFFTa and IFFTb) for the IFFT used. Thus, for an overlap of one half, the first calculation of FFT1, that is to say FFT1a, uses the samples x1a and x1r and the second calculation of FFT1, that is to say FFT1b, uses the samples x1r and x1b. The second half of the samples of the first calculation FFT1a, that is to say x1r, is used for the second calculation FFT1b. The second half of the samples of the second calculation FFT1b, that is to say x1b, will be used for a third calculation of FFT1, that is to say FFT1c (not shown), and so on.

For each of these storages, there is no duplication of the overlapping samples xr. This has the advantage of reducing the memory used. If the samples are received in packets of 2 kilobytes, the first, second and third memory areas R11, R12 and R13 will be of 3 kilobytes for an overlap of ½ and not of 4 kilobytes. In addition, this avoids managing two memory areas each of 2 kilobytes for each FFT used. The control means CNTRL make it possible to know which are the samples which are overlapping samples xr, according to the size of the transform used and according to the overlap used by virtue of the same principle based on an identification signal S_IDP seen before. This principle is known to one of ordinary skill in the art and will therefore not be disclosed here. It should be noted that, in the VSB case, the transform which has priority with respect to the others is the one which is in the process of making calculations and otherwise the one which first receives the samples necessary for making said calculations.

Naturally, the invention is in no way limited to Fourier transforms, and may extend to other discrete transforms such as a discrete cosine transform DCT used, for example, in a video processing application.

Naturally, the invention is in no way limited to the field of terrestrial television and may be extended to other fields, notably to all those which use a system utilizing discrete transforms.

Naturally, the verb "comprising" does not exclude the presence of other elements or steps listed in a claim. The article "a" preceding an element or step does not exclude the presence of a plurality of such elements or steps.

The invention claimed is:

1. A device for calculating discrete transforms, the device comprising:
   a processing circuit
      for calculating a first result using first samples and using a first type of transform from a plural number of discrete transform types; and
      for calculating a second result using second samples that correspond to the first calculated result and using a second type of transform of the plural number of discrete transform types;
   a first memory circuit for
      storing the first samples and
      for storing the second samples;
   a second memory circuit independent from the first memory circuit for recording intermediate calculation results from the first type of transform and second type of transform, and
   a control circuit for configuring the first and second memories as a function of a plural number of discrete transforms used during a first processing of the first type of transform.

2. A calculation device as claimed in claim 1, wherein the control circuit is able to determine priorities for calculation of the first type of transform with respect to the second type of transform and wherein the first type of transform is a Fourier transform for demodulation and the second type of transform is an inverse Fourier transform.

3. A calculation device as claimed in claim 1, wherein the first type of transform is a Fourier transform for demodulation and the second type of transform is an inverse Fourier transform used to synchronize the calculation device to a transmission corresponding to the received samples.

4. A discrete transform calculation method comprising:
in a first memory circuit,
- storing samples used in calculating a result obtained from first type of a plural number of discrete transform types and
- storing samples that correspond to the result from the first type of transform, and that are used in calculating a second type of the plural number of discrete transform types;

in a second memory circuit independent from the first memory, recording intermediate calculation results subsequently used in calculating the first type of transform and the second type of transform, and using a control circuit, configuring the first and second memories as a function of the plural number of discrete transforms used during a first processing of the first type of transform.

5. A calculation method as claimed in claim 4, further including a supplementary step of determining calculation priorities for the first type of transform with respect to the second type of transform and selecting between stored samples in response to determined priorities.

6. A calculation method as claimed in claim 5, wherein the first type transform is used in demodulation processing.

7. A receiver for calculating discrete transforms, comprising:
a first memory circuit for
- storing samples used in calculating a result obtained from a first type of a plural number of discrete transform types and
- storing samples that correspond to the result from the first type of transform, and that are used in calculating a second type of the plural number of discrete transform types;

a second memory circuit independent from the first memory for recording intermediate calculation results subsequently used in calculating the first type of transform and second type of transform, and a control circuit for configuring the first and second memories as a function of the plural number of discrete transform types used during a first processing of the first type of transform wherein the stored samples correspond to a received analog signal.

* * * * *